Figure 1:
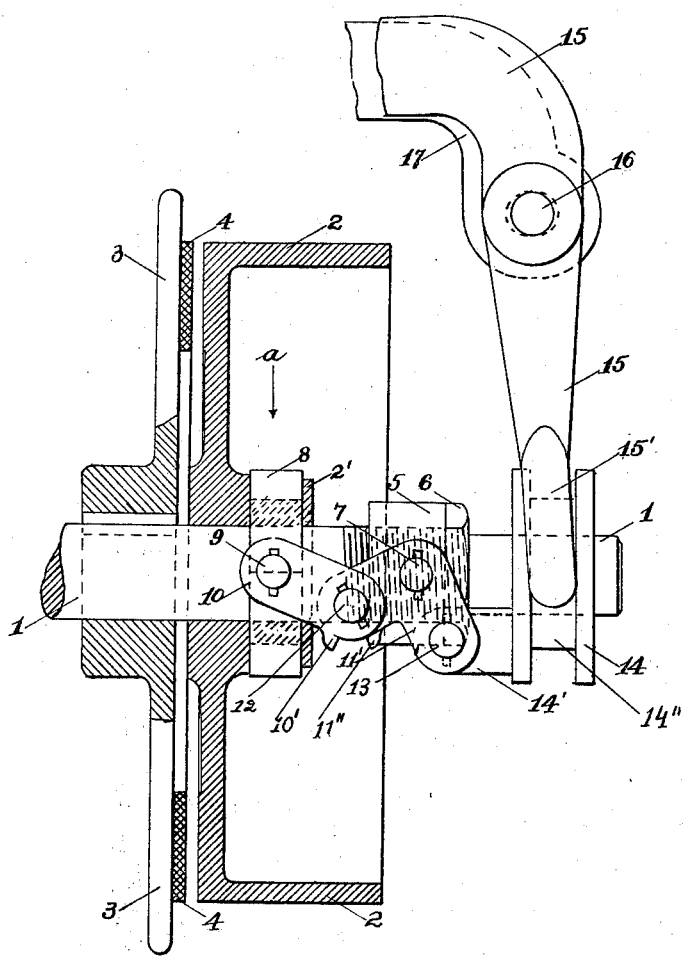

No. 627,084.  
H. WYMAN.  
FRICTION PULLEY.  
(Application filed Mar. 26, 1898.)  
(No Model.)

Patented June 13, 1899.

2 Sheets—Sheet 1.

Witnesses  
T. L. Nelson  
M. J. Galvin

Horace Wyman  
Inventor  
by John C. Dewey  
Attorney

No. 627,084. Patented June 13, 1899.
H. WYMAN.
FRICTION PULLEY.
(Application filed Mar. 26, 1898.)
(No Model.) 2 Sheets—Sheet 2.
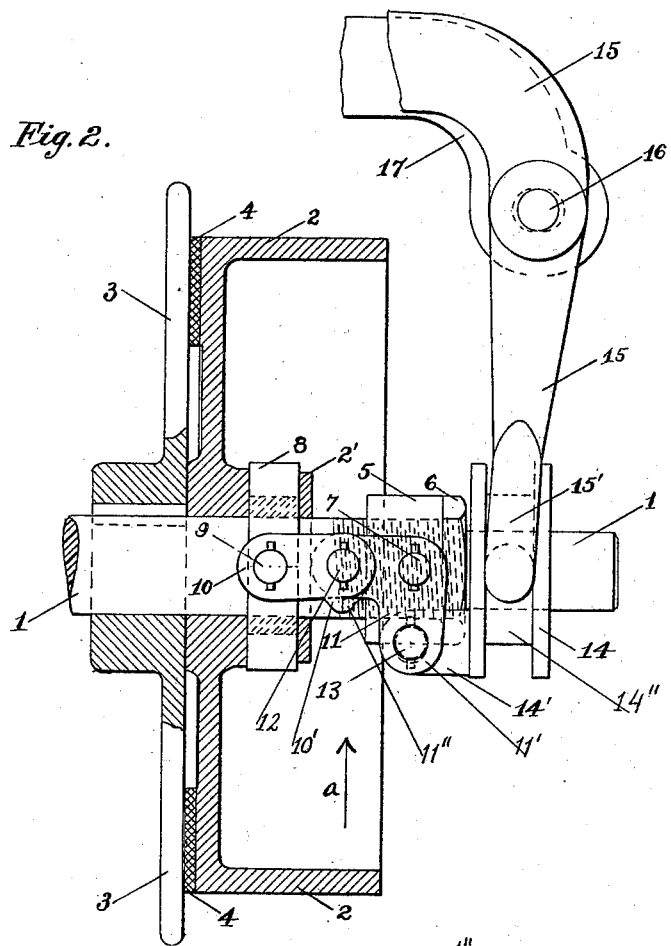
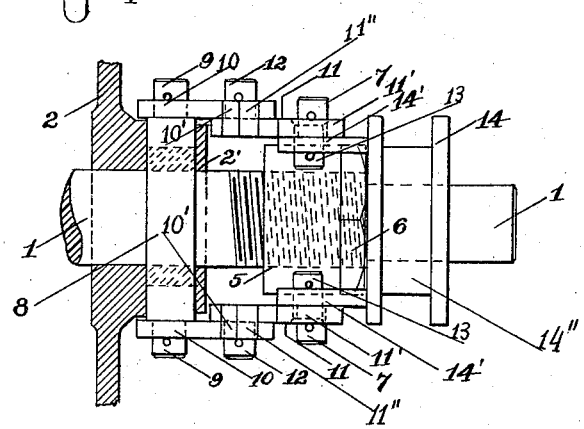
Witnesses
T. L. Nelson
M. J. Galvin
Horace Wyman,
Inventor
By John C. Dewey
Attorney

UNITED STATES PATENT OFFICE.

HORACE WYMAN, OF WORCESTER, MASSACHUSETTS.

FRICTION-PULLEY.

SPECIFICATION forming part of Letters Patent No. 627,084, dated June 13, 1899.

Application filed March 26, 1898. Serial No. 675,243. (No model.)

*To all whom it may concern:*

Be it known that I, HORACE WYMAN, a citizen of the United States, residing at Worcester, in the county of Worcester and State of Massachusetts, have invented certain new and useful Improvements in Friction-Pulleys, of which the following is a specification.

My invention relates to friction-pulleys and operating mechanism, and to that class of friction-pulleys in which the pressure is applied longitudinally of the shaft upon the pulley loosely carried thereon to produce sufficient frictional contact with a surface attached rigidly to the shaft to cause the shaft to revolve with the pulley. In this class of friction-pulleys as ordinarily made the endwise pressure to hold the surfaces in contact is resisted by some stationary parts of the frame supporting the shaft, as the end of the box in which it rotates, thereby requiring in some instances more power to overcome the friction between the stationary and revolving parts than may be required for the work required from the shaft.

The object of my invention is to do away with such fixed stationary parts, and consequently the friction between the same and the revolving parts, and to provide an improved friction-clutch mechanism of simple construction and effective operation, economical in construction, and very compact both longitudinally and diametrically, it taking up very little room outside of the pulley. As the parts of my friction-clutch mechanism are very near the shaft, it is less liable to throw oil or other lubricants from its jointed parts, at high rates of speed, and is also more protected from catching into anything which might come in contact with it, (as an operator's dress,) than other pulleys of like character.

My friction-clutch mechanism consists of a loosely-mounted pulley movable endwise, which, as is well known, will move more readily when in rotation on a stationary shaft than will a stationary clutch movable on a revoluble shaft. Combined with the pulley are knuckle-joints between a hub fixed on the shaft and a collar loosely carried on the pulley, the knuckle-joints being mounted upon pivots extending radially from the hub fixed on the shaft and the collar carried on the pulley, whereby by means of studs carried on arms projecting from a shipper pulley or sleeve and moving links pivoted upon the radially-projecting studs of the fixed hub on the shaft, which links are integral with one member of each of the knuckle-joints, the pulley is moved longitudinally and into frictional contact with a plate fast on the shaft to revolve said shaft.

Referring to the drawings, Figure 1 shows a side and partial sectional view of a friction-clutch mechanism embodying my improvements with the shaft not clutched to the pulley. Fig. 2 corresponds to Fig. 1, but shows the shaft clutched to the pulley; and Fig. 3 is a bottom view of the clutch mechanism shown in Fig. 1, looking in the direction of arrow *a*, same figure.

In the accompanying drawings, 1 is a shaft to be driven by frictional contact with the driven pulley 2, carried loose on said shaft.

3 is a disk or frictional plate keyed or otherwise secured on the shaft 1 and having a friction-ring 4, of leather or other suitable material, on the face thereof next to the inner face of the pulley 2.

A hub 5 is adjustably attached to the shaft 1 by screw-threads, as shown, and a locking-nut 6 holds the hub 5 in its adjusted position. The hub 5 is provided with two oppositely-extending radial pins 7.

The hub 2' of the pulley 2 is provided with an annular groove in which is loosely carried a collar 8, which has two oppositely-extending radial pins 9. Between the pins 7 on the hub 5 and the pins 9 on the collar 8 are the two pairs of links 10 10 and 11 11, pivotally connected with the pins 7 and the pins 9, as shown in Fig. 3, and also pivotally connected together by pins 12 12, secured in one set of links 10 10 or 11 11 to form a knuckle-joint. The links 10 and 11 have their flat sides toward the collar 8 and hub 5 and have lugs 10' 11'', which meet when the links are extended, as shown in Fig. 2, to prevent further movement.

The links 10 10 and 11 11, forming the knuckle-joint between the radial studs 7 on the hub 5 and the radial studs 9 on the collar 8, are operated to move the pulley 2 into or out of engagement with the frictional plate 3 by means of links 11' 11', in this instance made integral with the links 11 and pivoted on the radial pins 7 on the hub 5 and the pins 13 on the arms 14' on the shipper pulley or sleeve 14, loosely carried on the shaft 1. In the groove 14" of the pulley 14 the fork 15' of the shipping-lever 15, pivoted at 16 on a stationary arm 17, extends.

By the movement of the shipper-pulley 14 longitudinally on the shaft 1, through the links 10 and 11, connected therewith and with the collar 8 on the pulley 2, the pulley 2 is moved into frictional engagement with the friction-plate 3 on the shaft 1, as shown in Fig. 2, to cause the shaft 1 to revolve with the pulley 2 or out of engagement, as shown in Fig. 1, to unclutch the shaft and allow the same to be stationary.

From the above description, in connection with the drawings, the operation of my friction-clutch mechanism will be readily understood by those skilled in the art.

It will be seen that the hub 5 on the shaft 1 forms the stationary part of the clutch mechanism, and the position of this to vary the frictional contact between the pulley 2 and friction-plate 3 on the shaft 1 may be adjusted, as desired, by reason of the threaded engagement of the hub 5 with the shaft 1. When the shipper-pulley 14 is moved inwardly, the links 10 and 11, forming the knuckle-joint between the shipper-pulley 14 and the driven pulley 2, are extended or brought into line (and prevented from further movement by the lugs 10' and 11" butting against each other) to move the pulley 2 into frictional contact with the plate 3 on the shaft 1, as shown in Fig. 2, and cause said shaft to revolve with said pulley. When the the shipper-pulley 14 is moved outwardly or in the opposite direction, the knuckle-joint is collapsed or broken and the driven pulley 2 moved away from and out of engagement with the friction-plate 3 on the shaft 1, as shown in Fig. 1, to allow the shaft to remain stationary, the pulley 2 continuing to revolve.

It will be understood that the details of construction of my friction-clutch mechanism may be varied, if desired.

Having thus described my invention, what I claim as new, and desire to secure by Letters Patent, is—

In a friction-pulley mechanism, a shaft carrying a friction-plate fast thereon, and said plate, a pulley loosely mounted and adapted to move longitudinally on said shaft, into or out of engagement with said plate, the hub of said pulley having an annular groove therein, a collar loosely carried in said groove, and having two oppositely-extending radial pins, a pair of links with their flat sides toward said collar, and pivotally connected at one end with said radial pins, and at their other ends with a second pair of links, to form a knuckle-joint, and said second pair of links pivotally mounted on oppositely-extending radial pins on a hub with their flat sides toward said hub, and said hub adjustably attached to the shaft by screw-threads, and a locking-nut for holding the hub in its adjusted position, and a third pair of links made integral with the second-mentioned pair, and pivotally attached to pins or arms on the shipper-sleeve, and said sleeve loose on the shaft, and means for moving the same, to carry the pulley into or out of engagement with the friction-plate, substantially as shown and described.

HORACE WYMAN.

Witnesses:
J. C. DEWEY,
M. J. GALVIN.